(12) United States Patent
Boer et al.

(10) Patent No.: US 6,439,617 B1
(45) Date of Patent: Aug. 27, 2002

(54) COUPLER FOR A PIPE OR HOSE SECTION

(75) Inventors: Hans Boer, Hardenberg (NL); Hartmut Breukelman, Neuenhaus; Johannes Spykman, Emlichheim, both of (DE)

(73) Assignee: Wavin B.V., Zwolle (NL)

( * ) Notice: Subject to any disclaimer, the term of this patent is extended or adjusted under 35 U.S.C. 154(b) by 0 days.

(21) Appl. No.: 09/509,134

(22) PCT Filed: Aug. 8, 1998

(86) PCT No.: PCT/EP98/05035

§ 371 (c)(1),
(2), (4) Date: Mar. 29, 2000

(87) PCT Pub. No.: WO99/15825

PCT Pub. Date: Apr. 1, 1999

(51) Int. Cl.[7] ................................................. F16L 39/00
(52) U.S. Cl. ......................... 285/256; 285/244; 29/508
(58) Field of Search ................................. 285/256, 259, 285/27, 239, 244, 260, 304, 351; 29/508, 516

(56) References Cited

U.S. PATENT DOCUMENTS

| | | | | |
|---|---|---|---|---|
| 2,978,263 A | * | 4/1961 | Walsh et al. | 285/256 |
| 4,407,532 A | | 10/1983 | Patel et al. | |
| 4,726,612 A | * | 2/1988 | Picton | 285/256 |
| 4,758,023 A | * | 7/1988 | Vermillion | 285/7 |
| 4,969,667 A | * | 11/1990 | Sauer | 285/256 |
| 5,094,493 A | * | 3/1992 | Sauer | 285/256 |
| 5,426,842 A | * | 6/1995 | DeBoalt et al. | 29/508 |
| 5,609,370 A | * | 3/1997 | Szabo et al. | 285/351 X |
| 5,911,448 A | * | 6/1999 | Feher | 285/256 X |
| 5,984,376 A | * | 11/1999 | Lampe | 285/256 |
| 6,095,494 A | * | 8/2000 | Eagle | 251/215 |

* cited by examiner

Primary Examiner—Lynne H. Browne
Assistant Examiner—David E. Bochna
(74) Attorney, Agent, or Firm—Jodan and Hamburg LLP

(57) ABSTRACT

A coupler for a pipe or hose section has a coupling body, at least one coupling piece integrally formed therewith and a pressing sleeve, which can be previously joined to the coupling body. The coupling body and the pressing sleeve can be previously joined by a locking or interlocking connection.

19 Claims, 2 Drawing Sheets

COUPLER FOR A PIPE OR HOSE SECTION

BACKGROUND OF THE INVENTION

The invention relates to a coupler for a pipe or hose section.

U.S. Pat. No. 4,407,532 discloses a coupler with a hose section having a coupling body with a coupling piece integrally formed therewith and a pressing sleeve which can be pre-assembled to the coupling body. When using this coupler, a connectable hose end is introduced in an annular gap between the coupling piece and the pressing sleeve and connected by concentrically pressing the pressing sleeve together with the coupler.

The desired pre-assembly between the coupling body and the pressing sleeve is achieved with known couplers by inserting the pressing sleeve with its front end over the area of the coupling body adjacent to the coupling piece and pressing a stop projection projecting inwardly from the pressing sleeve through a plastic deformation in an annular stop groove in the coupling body. Since the inside diameter of the stop projection of the pressing sleeve is larger than the outside diameter of the annular projection, in order to be able to insert the same over the annular projection formed between the stop groove and the coupling piece, prior to achieving the pre-assembly, substantial pressure must be applied to the plastic deformation to achieve the pre-assembly and a special tool is required for this. The rejection rate with couplers is relatively high in the production of such pre-assembly. The above-mentioned pre-assembly between the coupling body and the pressing sleeve is not suitable for the use of coupling bodies made of plastic since they would not withstand the pressures exerted upon them when producing the pre-assembly. The use of coupling bodies of plastic is, however, advantageous with regard to use for coupling for pipes or hoses carrying water.

SUMMARY OF THE INVENTION

The invention therefore relates to a generic coupling in which the coupling body and the pressing sleeve can be pre-assembled in a simple manner that is favorable in terms of production costs.

Through the use of a locking or interlocking connection, the pre-assembly of the coupling body and pressing sleeve can be achieved rapidly and simply without tools and without risk of damage.

When selecting a locking connection, it is preferable that the front end be designed in an elastically deformable manner with the pressing sleeve where the front end of the pressing sleeve preferably locks with the coupling body upon spring-back.

The inventive coupler is advantageously suited for the use of plastic, particularly polymers such as polysulfone or polyphenylene sulfone, as the material of the coupling body where the pressing sleeve can consist of stainless steel.

With such a coupler, pipe or hose sections can be connected with as many additional connections as desirable such as additional pipe or hose sections. Other arrangements such as Ts, reducers, elbows, transitions to sections with internal or external threads or similar types are possible with the inventive coupler. Further advantages and details of the invention are shown in the accompanying drawings. In the Figures:

BRIEF DESCRIPTION OF THE INVENTION

DESCRIPTION OF THE PREFERRED EMBODIMENT

Figure 1:
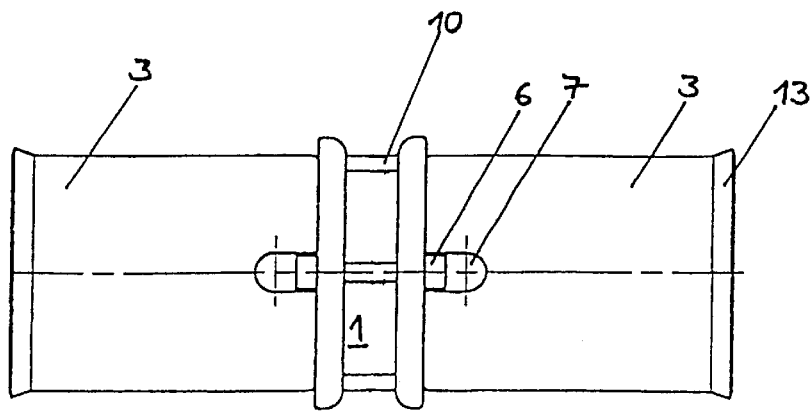
FIG. 1 shows a top view of the inventive coupler.
Figure 2:
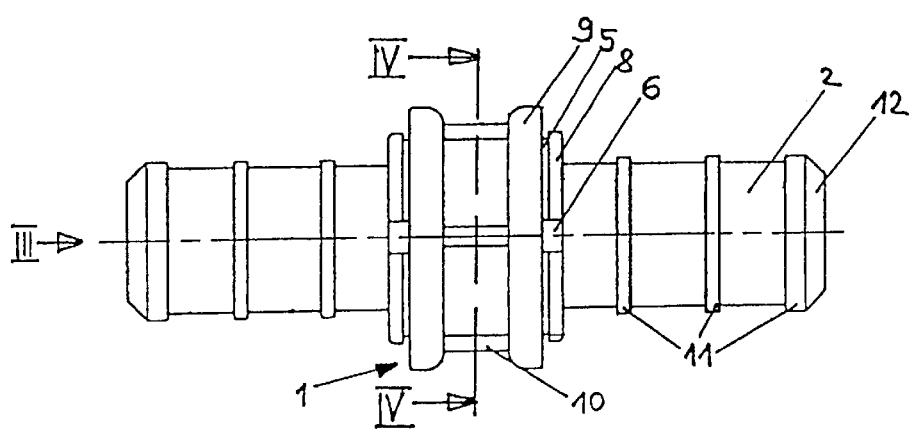
FIG. 2 shows details of the coupling body of FIG. 1.
Figure 5:
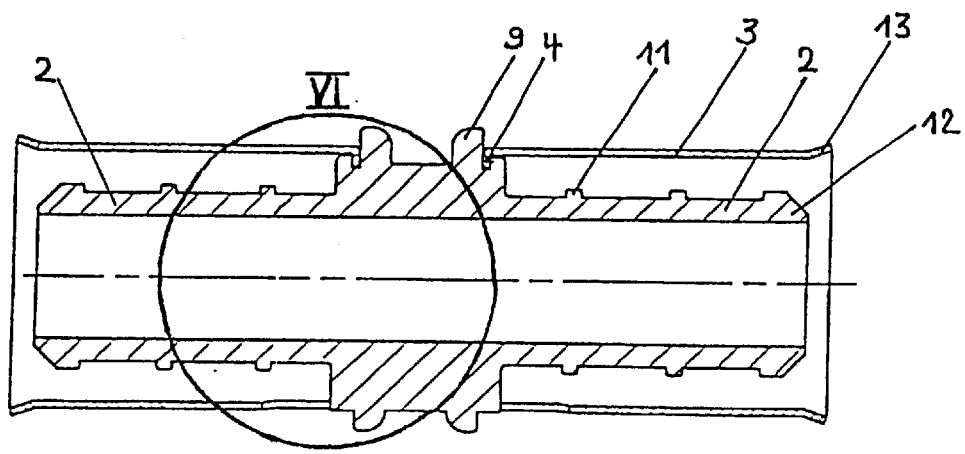
FIG. 5 shows a cross-section taken along line V—V in FIG. 3.
Figure 6:
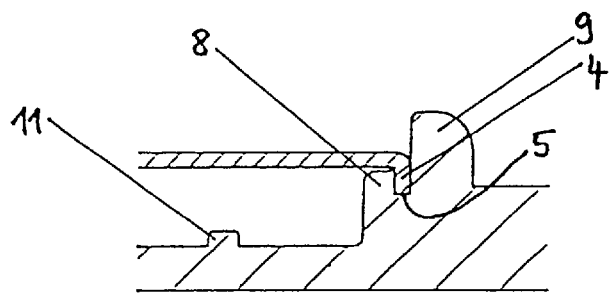
FIG. 6 shows an enlargement of section VI in FIG. 5.
Figure 6:
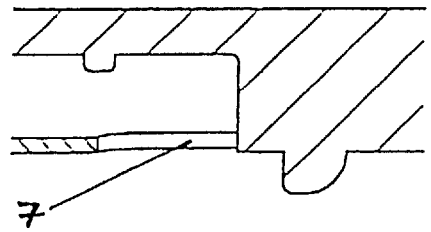

The coupler shown in FIGS. 1 and 5 has a coupling body 1 that has two coupling parts extending on either side. Each connecting part 2 receives a pressing sleeve 3 and each pressing sleeve 3 is bent inward at its front end opposite the free end of the connecting piece 2, to form a stop projection 4 that extends into a stop groove 5 on the coupling body 1 almost completely circling it.

In the embodiment shown, each stop groove 5 is interrupted at two opposing locations by projections 6. The pressing sleeves 3 have recesses, formed as openings 7, corresponding to the projections 6, into which the projections 6 extend, preventing rotation of the pressing sleeve 3 in relation to coupling body 1. The inside radius of the pressing sleeve 3 and the outside radius of the projections 6 are so closely fitted to each other that the rotation prevention achieved gives way after a certain torsional force exerted on pressing sleeve 3 or coupling body 1 is exceeded, enabling rotation of the pressing sleeve 3 in a circumferential direction. This arrangement thus forms an additional overload protection and thus, for example, prevents shearing off from the coupler of a pipe or hose connected with the coupler.

Furthermore, the openings 7 in the pressing sleeve are longer in the axial direction of the coupler than the projections 6 and thus provide a window for the checking of the proper insertion depth of the pipe or hose sections to be coupled together.

Each stop groove 5 subdivides the area of coupling body 1 holding a pressing sleeve 3 into a ring shoulder 8 and a flange-like projection 9 projecting beyond the outside diameter of pressing sleeve 3. The surface of projection 9 facing pressing sleeve 3 is flat and forms a guide or positioning stop for an implement. The coupling body 1 is reinforced in the middle between the two flange-like projections 9 by means of four ribs 10 arranged circumferentially at equal distances in the longitudinal direction of coupling body 1. Each of the two coupling pieces 2 has three ribs 11 running radially that take over the sealing function so that a sealing ring and a channel for insertion therefor into coupling piece 2 become unnecessary. The outmost rib 11 has a conical portion 12 in the embodiment shown, which conical portion facilitates the insertion of a hose or pipe section in connection with an outwardly-expanded area 13 of the pressing sleeve 3.

Figure 3:
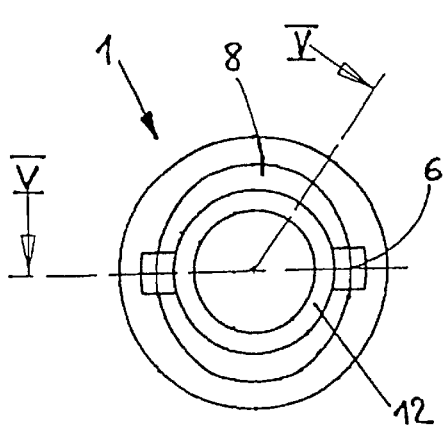
FIG. 3 shows a side view from the direction III in FIG. 2.
Figure 4:
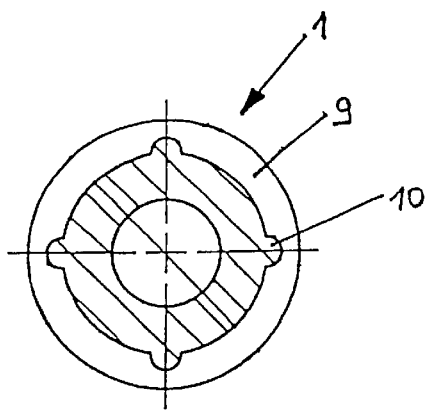
FIG. 4 shows a cross-section taken along line IV—IV in FIG. 2.

In the embodiment shown, the ring shoulder 8 holding the pressing sleeve 3 is formed with an oval cross section (FIG. 3). The largest diameter on the ring shoulder 8 is spaced 90° from the projections 6. For the pre-assembly of the pressing sleeve 3 with the coupling body 1, the pressing sleeve 3 can be temporarily deformed into an oval shape by pressure on the areas with the openings 7 and then inserting the pressing sleeve 3 over the ring shoulder 8. Upon release, the pressing sleeve 3 returns to its original round form and locks with the annular stop projections 4 behind the ring shoulder 8 that project over the inside diameter of stop projections 4 so that a secure pre-assembly is achieved.

In place of the preferred embodiment of a locking coupling described above, any other locking or interlocking coupling can be used that insures a secure, lasting coupling without using tools and that does not require unreasonable design expenses. Thus, for example, a circumferential locking groove is conceivable in connection with a temporarily expandable locking band on the pressing sleeve or a bayonet-style interlocking of the parts.

We claim:

1. A coupler for conduits, comprising:
   a coupling body having at least one coupling part, said coupling body having a groove and an outwardly extending shoulder juxtaposed to said groove, said shoulder having an outer surface with a non-circular configuration;
   a pressing sleeve disposed about said coupling part, said pressing sleeve having a projection extending generally radially inwardly, said projection being disposed in said groove in said coupling body, said shoulder of said coupling body being disposed within said pressing sleeve juxtaposed to said projection on said pressing sleeve, said pressing sleeve having a resilient portion, said resilient portion being enabled to be temporarily pressed into a sprung non-circular configuration to enable said resilient portion to pass over said outer surface of said shoulder, said resilient portion being enabled to assume an assembled configuration different from said non-circular sprung configuration when said resilient portion is no longer temporarily pressed; and
   an interlocking connection lockingly connecting said pressing sleeve to said coupling part.

2. A coupler according to claim 1 wherein said sprung non-circular configuration is a generally oval configuration.

3. A coupler according to claim 1 wherein said sprung non-circular configuration is a generally elliptical configuration.

4. A coupler according to claim 1 wherein said assembled configuration of said resilient portion is a generally circular configuration.

5. A coupler for conduits, comprising:
   a coupling body having at least one coupling part, said coupling body having a groove and an outwardly extending shoulder juxtaposed to said groove, said shoulder having an outer surface having a maximum diameter and a minimum diameter, said groove in said coupling body having an inner diameter less than said maximum diameter and less than said minimum diameter of said outer surface of said shoulder;
   a pressing sleeve disposed about said coupling part, said pressing sleeve having a projection extending generally radially inwardly, said projection being disposed in said groove in said coupling body, said shoulder of said coupling body being disposed within said pressing sleeve juxtaposed to said projection on said pressing sleeve; and
   an interlocking connection lockingly connecting said pressing sleeve to said coupling part.

6. A coupler according to claim 5 wherein said coupling body has at least one protuberance, said pressing sleeve having an end portion with at least one recess, said protuberance being disposed on said recess.

7. A coupler according to claim 6 wherein said protuberance is larger than said recess to thereby provide a window in said recess to enable viewing of the depth of insertion of the conduit to be coupled on the coupling body.

8. A coupler according to claim 5 wherein said coupling body has a longitudinal axis, said coupling body having an outward protuberance having a protuberance shoulder, said protuberance shoulder having a protuberance surface generally perpendicular to said longitudinal axis, said protuberance having an outer diameter greater than the outer diameter of said pressing sleeve such that a portion of said protuberance surface extends radially outwardly of said pressing sleeve.

9. A coupler for conduits, comprising:
   a coupling body having at least one coupling part, said coupling body having at least one protuberance;
   a pressing sleeve disposed about said coupling part, said pressing sleeve including an end portion having an inner diameter, said pressing sleeve having at least one recess in which said protuberance is received, said protuberance having an outer diameter greater than said inner diameter of said end portion of said flexible sleeve, said end portion of said pressing sleeve being enabled to be flexed to a sprung configuration such that at least parts of said end portion of said pressing sleeve take on a diameter at least as great as the outer diameter of said protuberance to enable said pressing sleeve to be at least partially rotated relative to said coupling body; and
   an interlocking connection lockingly connecting said pressing sleeve to said coupling part.

10. A coupler according to claim 9 wherein said coupling body is made of a plastic material.

11. A coupler according to claim 10 wherein said plastic material is selected from the group consisting of polysulfone and polyphenylene sulfone.

12. A coupler according to claim 9 including at least one circumferential rib on said coupling body.

13. A coupler for conduits, comprising:
   a coupling body having at least one coupling part, said coupling body including a groove having groove walls, said coupling body having an outward protruding protuberance having a protuberance surface substantially coextensive with one of said groove walls;
   a pressing sleeve disposed about said coupling part, said pressing sleeve having a projection extending generally radially inwardly, said projection being disposed in said groove, said protuberance and said protuberance surface having a diameter greater than an outer diameter of said pressing sleeve; and
   an interlocking connection lockingly connecting said pressing sleeve to said coupling part.

14. A method of assembling a coupler body and a pressing sleeve to provide a pre-assembled coupler unit to be used for coupling conduit section comprising:
   providing a coupler body having a circular groove portion and a non-circular portion juxtaposed to said groove;
   providing a flexible sleeve having an unsprung condition in which the flexible sleeve has a generally circular configuration;
   providing said flexible sleeve with an inwardly extending projection;
   pressing at least a part of said sleeve into a temporarily sprung condition in which said pressed part of said sleeve takes on a temporary non-circular configuration conforming generally to the configuration of said non-circular portion on said coupler body;
   sliding said pressed part of said pressed sleeve axially over said non-circular portion of said coupler body until the inner projection on the sleeve reaches the circular groove portion on said coupler body;
   removing the pressing of said part of said sleeve to thereby release the temporary sprung condition; and effecting insertion of said inner projection on said coupler body into said circular groove portion upon release of said sprung condition.

15. A method according to claim 14 further comprising providing at least one protuberance on said coupler body and at least one slot in said pressing sleeve, and effecting insertion of said protuberance into said slot as said part of said pressing sleeve is slid axially over said non-circular portion of said coupler body.

16. A method according to claim 14 where in said circular groove portion on said coupler body has a circular bottom and said projection on said pressing sleeve has an inner edge portion which is generally circular when said pressing sleeve is in said unsprung condition, said step of effecting insertion of said inner projection on said coupler body into said circular groove portion upon release of said sprung condition comprising effecting engagement between said circular bottom of said groove and said inner edge portion of said projection on said pressing sleeve.

17. A method according to claim 14 wherein said non-circular portion on said coupler body has a generally oval configuration having a first diameter and a second diameter less than said first diameter, said non-circular portion having a first arcuate section opposite said first diameter and a second arcuate section opposite said second diameter, said step of effecting insertion of said inner projection on said coupler body into said groove portion upon release of said sprung condition enabling generally radially outward movement of a section of said pressing sleeve juxtaposed to said inner projection on said pressing sleeve away from said second arcuate section of said non-circular portion on said coupler body to thereby provide a space between said second arcuate section and said section of said pressing sleeve.

18. A method according to claim 14 wherein said sleeve is made of sheet metal which enables pressing at least part of said sleeve into said temporarily sprung condition.

19. A method according to claim 14 wherein said coupler body is made of plastic and said sleeve is made of metal.

* * * * *

UNITED STATES PATENT AND TRADEMARK OFFICE
CERTIFICATE OF CORRECTION

PATENT NO. : 6,439,617 B1 Page 1 of 1
DATED : August 27, 2002
INVENTOR(S) : Hans Boer et al.

It is certified that error appears in the above-identified patent and that said Letters Patent is hereby corrected as shown below:

<u>Title page,</u>
Item [30], insert

-- [30]  Foreign Application Priority Data

Sep. 22, 1997    (DE) ............... 197 41 641 --

Item [74], *Attorney, Agent, or Firm*, "Jodan and Hamburg LLP" should read
-- Jordan and Hamburg LLP --

Signed and Sealed this

Seventeenth Day of December, 2002

JAMES E. ROGAN
*Director of the United States Patent and Trademark Office*